Aug. 26, 1930. H. W. SLOAT 1,774,110
PROCESS OF PRODUCING SYNTHETIC NUTS
Filed June 1, 1927
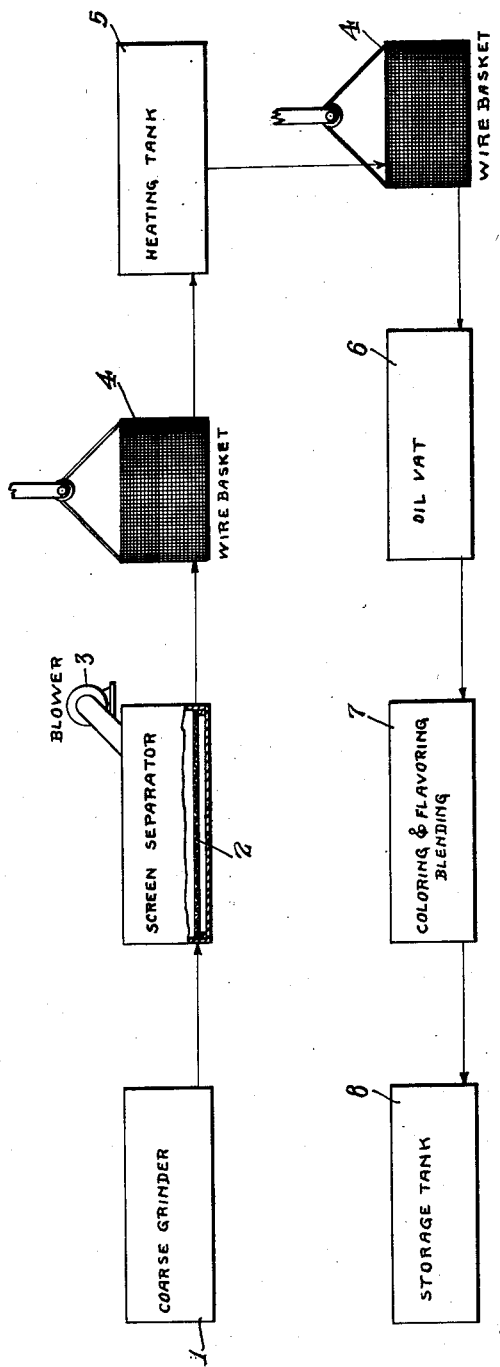
Inventor
Harry W. Sloat
By Lyon+Lyon
Attorneys Patented Aug. 26, 1930

1,774,110

UNITED STATES PATENT OFFICE

HARRY W. SLOAT, OF WILMAR, CALIFORNIA, ASSIGNOR TO H. W. SLOAT COMPANY, OF LOS ANGELES, CALIFORNIA, A CORPORATION OF CALIFORNIA

PROCESS OF PRODUCING SYNTHETIC NUTS

Application filed June 1, 1927. Serial No. 195,666.

This invention relates to synthetic nuts and the process of producing the same, and is more particularly related to the preparation of imitation or synthetic nuts from legumes or the like, having approximately the same chemical composition as real nuts when the same have been treated to remove portions of their characteristic oils, flavorings and the like The use of nut meats, with the possible exception of peanuts, has become very limited by confectioners, bakers, and the like, because of their scarcity and high cost. Nut meats do not keep and soon become rancid. Legumes, and particularly soya beans, have a flavor so much like that of the nut imitated when the legumes or soya beans have been subjected to a process by means of which their characteristic oil, color, and taste have been removed that they may be eaten as nuts of any particular kind in accordance with the flavoring matter which is blended with the portions of the treated legumes or soya beans. The legumes are inexpensive, plentiful, and may be processed inexpensively. The resultant product produced is not subject to spoiling or rancidity.

It is, therefore, an object of this invention to provide an imitation or synthetic nut consisting of prepared legumes prepared to remove the characteristic color and taste of the legume, an oil, and flavoring matter blended with the prepared legume.

Another object of this invention is to provide a process of preparing legumes to remove their characteristic color and taste, and their characteristic oil when necessary to reduce the same to substantially the chemical composition of real nuts, and of blending the prepared legumes with an oil and flavoring matter to produce a product having substantially the same chemical composition as real nuts.

Other objects and advantages of this invention, it is believed, will be apparent from the following detailed description of a preferred embodiment thereof.

In the drawings is diagrammatically illustrated a process of preparing synthetic nuts embodying this invention.

I have discovered that legumes, and particularly soya beans, may be prepared to have substantially the same chemical composition and physical characteristics of real nuts by subjecting the legumes or soya beans to a process in which they are first cleansed and subjected to boiling water or a solution of an alkali or the like, in order to remove from the legumes their characteristic color and taste, and in some cases, their oil content or part thereof, and by allowing the legumes to absorb water to expand the same and then immersing the legumes in hot oil to quickly liberate from the legumes the absorbed water and then blending with the legumes coloring and flavoring matter.

I have discovered that the character and quality of the nuts prepared in accordance with this invention may be greatly improved by storing the product as the same is produced in order to allow the same to age and that the product so prepared may be stored for great lengths of time and under varying conditions practically without liability of the same spoiling or turning rancid.

In accordance with the preferred process embodying this invention, soya beans or other legumes are first broken up into pieces in a coarse grinder 1. From the grinder 1, the legumes or soya beans are then caused to pass over a screen 2 which separates the skins and hulls from the beans and also separates the pieces of the legumes into sizes, the hulls or skins being removed by means of a blower or suction device 3 operatively positioned over the screen 2. The different sizes of pieces of legumes are preferably treated separately in the process so as to give more uniform and accurate results. The pieces of legumes of one size are put into a basket 4 and immersed in the basket 4 into a tank 5 of boiling or hot water and allowed to remain from 8 to 14 minutes. There may be added to the water in the tank 5 sodium bicarbonate in approximately the amount of 15 grams to every 3 liters of water. The legumes are then removed from the tank 5 in the wire basket 4 and allowed to remain in the wire basket 4 or in any other suitable form of container for a period of from 5 to 7 hours, more or less, to permit the portions of the legumes to absorb water to cause the same to swell. The pieces of legume or soya bean are swelled or expanded with the water in order to produce a comparatively soft product which is not tough or hard but of approximately the same density as real nuts.

The legumes are then submerged into an oil vat or tank 6 containing an oil heated to approximately 200° C. The portions of the legumes are allowed to remain in the oil until the bubbling of the oil or the liberation of water from the legumes ceases or practically ceases, at which time the same are removed and allowed to cool and dry. The quick liberation of the water from the pieces of legumes by means of the hot oil accomplishes the reduction of the water content of the product to that desirable in the product while liberating the water in a manner to maintain the protein of the legume expanded and hence soft and of the desired density.

The oil vat 6 is preferably of a diameter of at least 1⅔rds times that of the wire basket 4 within which the portions of the legumes are contained when submerged in the oil in the vat 6. The oil contained in the vat 6 is preferably of a weight of at least 4½ times that of the weight of the legumes submerged in the oil. The vat 6 is made of a diameter of approximately 1⅔rds times that of the basket 4 in order to permit the free volatilization of the water contained in the legumes without undue frothing of the oil in the vat 6. The oil is maintained in the vat 6 to a weight of substantially 4½ times that of the legumes submerged in the oil in order to prevent reduction of the temperature of the oil in the vat 6 materially below 200° C. by the submerging in the oil of the cold legumes. The submerging of the legumes in the oil serves the purpose of quickly liberating the water from the legumes and maintaining of the legumes in the expanded or swelled condition caused by the absorbing of the water in the legumes and also serves the purpose of permitting the legumes to take up a certain portion of the oil in the vat 6 which should be an edible oil. If the oil temperature in the vat 6 is too low, the product produced is tough, and if too high, the legume is burned.

After the legumes have been allowed to cool and dry after the oil treatment, the same are then placed in a blending machine, diagrammatically illustrated at 7, and blended with flavoring matter and coloring matter, if desired, depending upon the color and flavor desired in the resultant product.

Any fat or oil may be employed in the vat 6, such for example as cottonseed, sesame, corn, white oil, animal fats, soya bean oil, raisin, peach seed, apricot seed, prune seed, or other edible oils that will withstand the heat of 190° C. to 200° C. or thereabouts. Cocoanut oil, however, has been found most preferable.

In order to increase the quality of the product produced and to form a product of better taste, I prefer to store the final colored and flavored product in any suitable form of storage container, as illustrated at 8, for a period of several months in order that the product will age.

In the preparation of synthetic nuts, the particular nut produced will depend principally upon the flavoring blended in the blending machine 7, for example, in the preparation of pistachio nuts, almonds, English or black walnuts, pecan nut meats or the like, the flavorings employed may be any suitable synthetic or natural flavoring commonly employed for the production of other nut flavored products.

Any other suitable or desirable means or method of removing the characteristic color and taste of the legumes may be employed, as is well understood in the art.

For example, one modified method of preparing imitation or synthetic nut meats includes the submerging of whole soya beans or legumes in a boiling solution of 70 grams of sodium bicarbonate to every 4 liters of water and allowing the same to remain for 10 minutes. The legumes are then removed and thrown into a mixing machine, within which there is provided a wire beater which rotates and beats the soya beans or legumes to remove the skins or hulls and separate the legumes into halves. The hulls and skins are then washed from the halves of the legumes with cold water and then the halves of the legumes are submerged in boiling water from 12 to 15 minutes. The halves of the legumes are then dried slightly. The legumes may then be pressed, chopped, rolled, sliced, squeezed, or cut in forms and set aside to dry slightly. Finely ground desiccated cocoanut, gums, dried abumen, flour, cocoanut oil, or other edible oils or fat, chopped nut meats of any kind, either raw or roasted, flavorings, coloring matter, or any other ingredients may be pressed with the above soft prepared legumes in any size or shape desired. The product is then dried throughly and as quickly as possible. The drying may be accomplished in an oven, depending upon the materials put together, from 95° C. to 200° C. The product may also be heated in cocoanut oil or any other edible oil or fat. The temperature to which the oil is heated depends upon the ingredients used in the combination. The temperature of the oil should be such as to produce very rapid liberation of the water from the product without permitting too great quantity of the oil being absorbed in the product, but the temperature must not be so high as to burn the product. If no other ingredients are added to the halved legumes or soya beans, they may be submerged in cocoanut oil heated to between 175° C. and 200° C. depending upon the kind of product desired.

The prepared imitation nuts produced in accordance with this invention may be used in any manner in which real nuts are used, for example, the imitation nuts may be ground finely and mixed with an edible oil to the consistency of nut butter to produce an imitation nut butter.

Having fully described my invention, it is to be understood that I do not wish to be limited to the details herein set forth, but my invention is of the scope of the appended claims.

I claim:

1. A process of producing synthetic nuts, comprising submerging soy beans in hot water for about eight to fourteen minutes, removing the beans from said hot water and permitting moisture adhering to said beans to become absorbed therein, and then submerging the beans in a vegetable oil at a temperature of about 200 degrees C. to drive off the absorbed moisture.

2. A process of producing a synthetic nut, comprising submerging soy beans in hot water containing sodium bicarbonate for a period of eight to fourteen minutes so as to remove the characteristic soy bean taste, removing the beans from said hot sodium bicarbonate solution and permitting adhering moisture to become absorbed in the beans, and then submerging the beans in a vegetable oil at a temperature of about 200 degrees C. to drive off the absorbed moisture.

Signed at Los Angeles, California, this 25 day of May 1927.

HARRY W. SLOAT.